United States Patent [19]

Vetter

[11] 4,069,645
[45] Jan. 24, 1978

[54] VACUUM PACKAGING MACHINE FOR THE PRODUCTION OF SEALED PACKAGES

[75] Inventor: Arthur Vetter, Gronenbach, Germany

[73] Assignee: Multivac Sepp Haggenmueller KG, Wolfertschwenden, Germany

[21] Appl. No.: 599,233

[22] Filed: July 25, 1975

[30] Foreign Application Priority Data

Aug. 1, 1974 Germany .................. 7426246[U]

[51] Int. Cl.² ........................................... B65B 43/08
[52] U.S. Cl. .............................. 53/112 A; 53/184 R
[58] Field of Search ............. 53/22 A, 112 A, 184, 53/282; 74/30, 131

[56] References Cited

U.S. PATENT DOCUMENTS

| 248,590 | 10/1881 | Harvey | 74/131 |
|---|---|---|---|
| 2,976,658 | 3/1961 | Kostur | 53/112 A |
| 3,061,984 | 11/1962 | Mahaffy | 53/112 A X |
| 3,328,937 | 7/1967 | Newman et al. | 53/184 R X |
| 3,343,336 | 9/1967 | Bradford | 53/184 X |
| 3,371,464 | 3/1968 | Swick | 53/112 A |
| 3,397,508 | 8/1968 | Stroop | 53/184 R X |
| 3,415,134 | 12/1968 | Nittka | 74/30 X |
| 3,509,686 | 5/1970 | Bergstrom | 53/112 A |
| 3,808,772 | 5/1974 | Turtschan | 53/184 R X |

Primary Examiner—Travis S. McGehee
Assistant Examiner—John Sipos
Attorney, Agent, or Firm—W. G. Fasse; W. W. Roberts

[57] ABSTRACT

A vacuum packaging machine is provided in which the working stations are mounted on a movable rod, this rod is provided with means to move the working stations back and forth and simultaneously drive the web feed arrangement thereby achieving an almost continuous flow of the web at the necessary rate.

10 Claims, 2 Drawing Figures

VACUUM PACKAGING MACHINE FOR THE PRODUCTION OF SEALED PACKAGES

BACKGROUND OF THE INVENTION

The invention relates to a vacuum packaging machine for the production of sealed packages having at least one deep drawing station including an upper processing unit and a lower processing unit adapted to perform reciprocating movements with respect to each other, means to feed the packaging material, whereby the material or web is fed continuously also during the working cycles of the working stations.

German Patent Publication No. 2 301 217 discloses a vacuum packaging machine in which the working stations are arranged on carriages which are moved back and forth on two stationary shafts. The upper and lower processing units are moved towards each other and apart by a cam drive and lever arms. The closing of the working stations occurs at the dead point of the lever system.

OBJECT OF THE INVENTION

It is a primary object of the invention to provide a vacuum packaging machine which utilizes the movement of the working stations to achieve an almost continuous feeding of the packaging material.

It is a further object of the present invention to provide a vacuum packaging machine in which no cam drive and no lever systems are necessary.

It is still a further object of the invention to provide a vacuum packaging machine in which the amount of web feed is easily adjustable.

SUMMARY OF THE INVENTION

In accordance with the invention, the above objects are achieved by providing a vacuum packaging machine in which the working station is connected to a rod, this rod having means to simultaneously drive the web feeding arrangement during the reciprocating movement of the rod.

In one embodiment of the invention the rod is moved back and forth by a cylinder.

In accordance with a special embodiment of the invention the rod engages a first and a second gear wheel, the first gear wheel being connected by means of an over running coupling with a first sprocket, the second gear wheel being connected by means of an over running coupling with a second sprocket, these sprockets driving the web feeding arrangement.

In this way the web feeding arrangement is driven by the first and the second gear wheel during the reciprocating movement of the rod.

Further features and advantages of the invention are apparent from the description of the preferred embodiment in connection with the Figures.

BRIEF FIGURE DESCRIPTION

FIG. 1 is a cross sectional view of an embodiment of the invention whereby the front side wall has been omitted and the working stations are shown schematically; and FIG. 2 is a cross sectional view of a vacuum packaging machine taken along line II—II of FIG. 1.

DETAILED DESCRIPTION OF EXAMPLE EMBODIMENT

Figure 1:
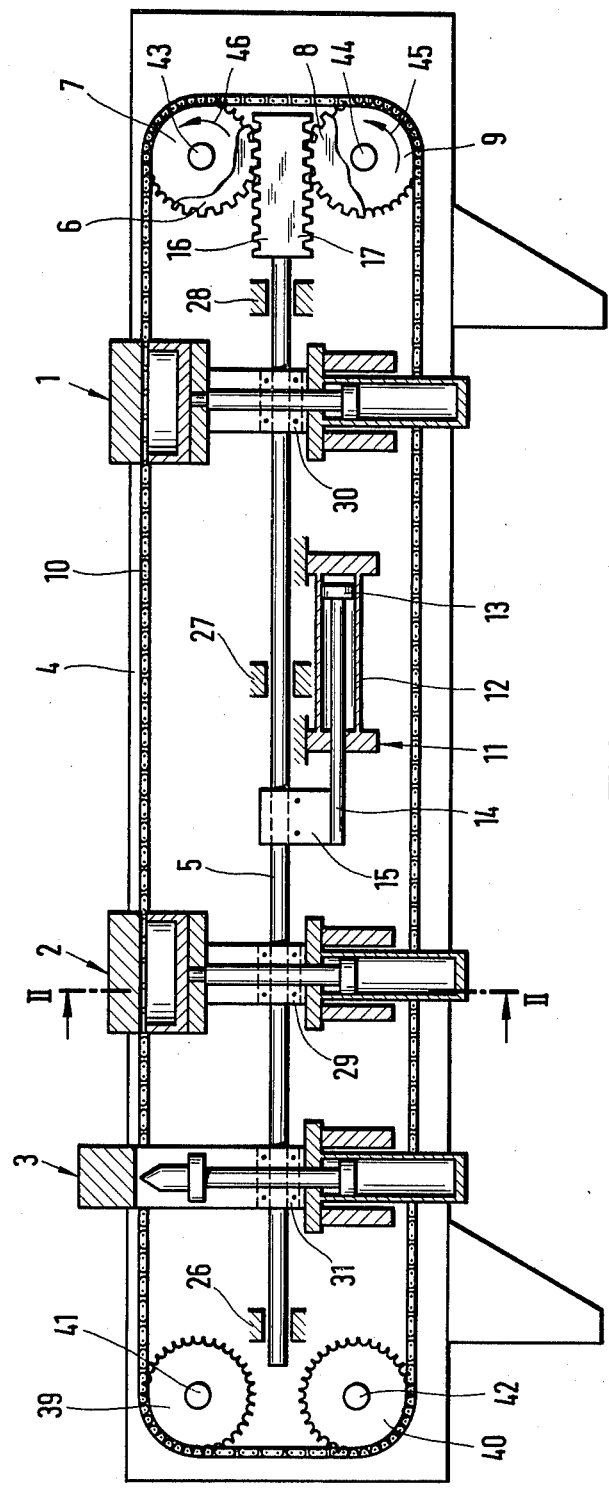
Figure 2:
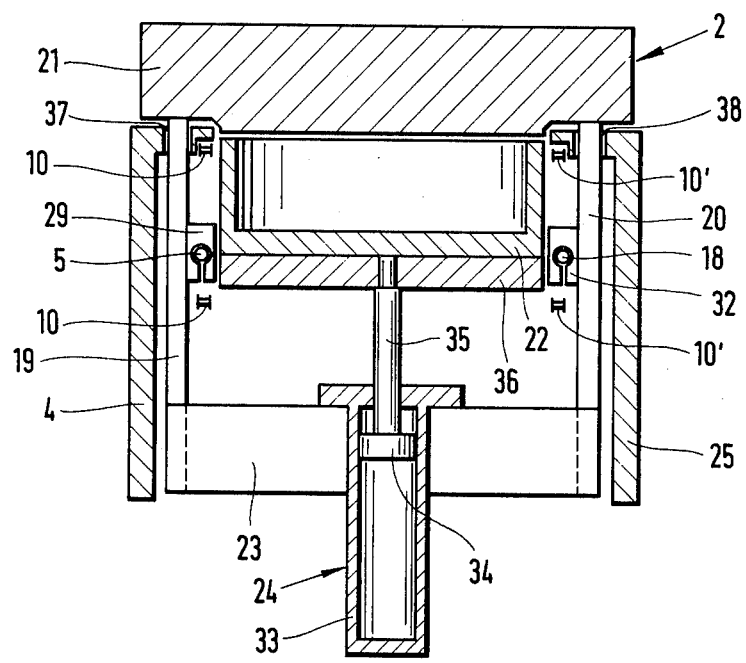

The embodiment of the vacuum packaging machine shown in FIG. 1 exhibits machine frame 4, 25, with side frame 25 omitted to facilitate the illustration. Rods 5, 18, are coupled with machine frame 4, 25, for reciprocation with respect thereto by journals 26, 27, 28, the journals being fixed to the machine frame. Rod 18, which is shown in FIG. 2 is hidden by rod 5 in FIG. 1. The rods 5, 18, are reciprocated relative to the frame by means of a feed cylinder arrangement 11 formed of a cylinder 12, a piston 13, a piston rod 14, and a connecting link 15 connected to the rods.

The rods carry work stations 1, 2, 3. The work stations are in the disclosed exemplary embodiment connected with the rods by means of clamps 29, 30, 31, 32, in the manner best seen in FIG. 2.

The three work stations shown in the exemplary embodiment in FIG. 1 are deep drawing station 1, vacuum station 2, and separating station 3. The construction of a work station in accordance with the inventive embodiment is best shown in FIG. 2, in which the vacuum station 2 is schematically illustrated in section. The work station includes an upper processing unit 21 and a lower processing unit 22. The upper processing unit 21 is fixedly mounted to the two side walls 19, 20, the lower ends of which are fixedly attached to a cross bar 23, in order to form a strong frame which includes the unit 21, the two side walls 19, 20 and the cross bar 23. On the side walls 19, 20 clamps 29, 32 are fastened on the inside of the frame at the level of rods 5, 18. The clamps are, in turn, connected by means of a clamp connection with the rods 5, 18, whereby the frames are carried by the rods and with the reciprocation of the rods are reciprocated relative to machine frame 4, 25.

The lower processing unit 22 is provided beneath the upper processing unit 21. The lower processing unit 22 is reciprocated relative to the upper processing unit by means of a piston-cylinder arrangement 24 formed of cylinder 33 fixedly mounted on the cross bar 23, piston 34, piston rod 35, and a lifting plate 36. The upper processing unit 21 and the lower processing unit 22 form a vacuum chamber. The chamber is connected in the usual manner with a vacuum pump by a not disclosed connecting pipe. The piston-cylinder arrangement 24 is connected with a not disclosed pressure medium input.

The vacuum station is opened and closed through the operation of piston-cylinder arrangement 24. The lifting and closing force operates only on the frame formed of the side parts 19, 20, the upper processing unit 21, and the cross bar 23, not on the machine frame. The stability of the machine is, thereby, substantially increased.

In the following, the connection between rods 5, 18, and the feed apparatus 10 is described by means of FIG. 2. The feed apparatus comprises, in the exemplary embodiment, a pair of chains 10, 10' (FIG. 1). The chain 10 shown in FIG. 1 is led about free wheeling feed sprockets 39, 40 and about sprockets 7, 9 in a closed track. The sprockets are mounted on axles 41, 42, 43, 44, respectively which are journalled in the machine frame.

Rod 5 contains upper and lower toothed rack 16, 17 in the end adjacent sprockets 7, 9. In the exemplary embodiment, the two toothed racks are formed as a single unitary double toothed rack. The toothed racks engage first and second gear wheels 6, 8 behind sprockets 7, 9, shown partially broken away, in FIG. 1. The first underlying gear wheel 8 is connected with sprocket 9 by means of an over running coupling so that with a movement of rod 5 to the left, the sprocket 9 is driven in the direction indicated by the arrow 45 and with a movement of the rod 5 in the opposite direction the sprocket is not driven. The upper, second gear wheel 6 is connected with sprocket 7 with an over running coupling so that the sprocket is driven in the direction of the arrow 46 with the movement of rod 5 and rack 16 to the right. Sprocket 7 is not driven with the movement of the rod 5 to the left. In this manner chain 10 is continuously driven through the linear reciprocation of rod 5 produced in response to a square wave type application of the driving force by the piston-cylinder apparatus 11.

The sprockets 7, 9, have a tooth spacing which corresponds to the link spacing of the applicable chain.

The mechanism described in connection with FIG. 1 for the rod 5 and chain 10 is similarly provided for the rod 18 and the chain 10'. It will be appreciated that the feed cylinder 11 is connected by an appropriate, not disclosed, conductor with a source of pressure. It will be further apparent that the work stations 1 and 3 contain in principle a similar construction to the work station shown in FIG. 2. Work stations 1 and 3 similarly comprise an upper processing unit which forms a frame with the side walls and a cross member, and a lower processing station which is reciprocated relative to the upper work station by means of a piston-cylinder arrangement connected to the cross member. The piston-cylinder unit is in each case connected with a pressure medium feed.

The machine works in the following manner. The packaging material web is moved, in the embodiment shown in FIG. 1, from the right and by the advance of lead chain 10, 10' on both sides and in substantially continuous movement is driven to the left by the reciprocating movement of rods 5, 18. In other words, the web is driven, i.e. pulled, by the chain. This may be effected by conventional techniques, e.g. by providing gripping devices on the chain. In the first work stroke, rods 5, 18, are returned to the right. At the same time, the lower processing units are lowered downward into the open position. In the extreme right hand position of rods 5, 18, the lower processing units move upward through the piston-cylinder arrangements and the processing units close. The processing units 1, 2, 3 in the closed position move simultaneously with the material being driven by chain 10, 10' from right to left. During this movement phase the receptacle is deep drawn at station 1. The actual vacuum packaging (production of the vacuum, sealing of the edges of the packaging out of the upper and lower webs) occurs at station 2 and the separation of the side by side arranged packages occurs at station 3. At the left hand end of the movement path of rods 5, 18, shown in FIG. 1, the processing units are opened through lowering of the lower unit. Therefore the work stations can freely move relative to the material webs. Through the coordinated return movement of rods 5, 18, to the right, the work stations are returned to the initial position and the work operation can begin anew. The length of the movement path of rods 5, 18 is so selected that from the release of the material web in the work station at the left dead center position of the movement path of the rods to the right dead center position of the movement path of the rods, the material web is just sufficiently moved that the work stations in each case engage not previously worked material. The length of the reciprocating movement path of the rods can be adjusted through control of the pressure medium input to the feed arrangement 11.

Thus, referrring to FIG. 1 when the rods 5, 18 are moved to the right by the piston cylinder arrangement, the rack 16, 17 is also moved to the right. This effects a counter-clockwise rotation of gear wheel 6 and a clockwise rotation of gear wheel 8. The overrunning clutch coupled to the gear wheel 6 is active for this direction of rotation, whereas the overrunning clutch coupled to the gear wheel 8 is inactive for this direction of rotation of the respective gear wheel. As a consequence, the upper course of the chain drive is driven to the left. At this time, since the working stations are directly connected to the rods 5, 18, they are also driven to the right. During this direction of movement, the piston cylinder arrangement 24 is not driven by the vacuum pump, so that the lifting plate 36 is in its lowermost position.

When the rods 5, 18 are driven to the left by the piston cylinder arrangement 11, the direction of rotation of the gear wheels 6, 8 is reversed, so that the gear wheel 8 is now driven counterclockwise and the rotary motion thereof is coupled by its respective overrunning clutch to the sprocket 9. The sprocket 9 thereby drives the chain 10, 10' so that its upper course is driven in the same direction as before, i.e., to the left. The movement of the chain 10, 10' is thereby substantially continuous in the same direction, although there may be a momentary stoppage at the instant of reversal of movement direction of the rods 5, 18.

During the time that the rods 5, 18 are moved to the left, the piston cylinder arrangement 24 is activated, to lift the lifting plate 36, so that a web driven by the chain may be processed. Since the chains 10, 10' and their working stations are both directly driven by the rods 5, 18, it is apparent that the working stations move synchronously with the chains.

The web is driven by the chains 10, 10' by conventional means, for example, as disclosed in U.S. Pat. No. 3,343,336, so that the web moves synchronously with the chains through the work stations 1, 2 and 3. As a result, during the leftward movement of the working stations, the web continuously moves at the same speed as the working stations.

In a practical embodiment the feed arrangement 11 is positioned in the middle between both rods 5, 18 so that it is connected by connection element 15 with both rods 5, 18 and so that the rods are simultaneously moved.

The spacing of work stations 1, 2, 3 to each other can be varied as by loosening the clamps 29, 32 and shifting the frames formed of the upper processing unit, the side walls, and the cross member relative to the rods. Also by the displacement of the work stations in this manner the processing units remain arranged concentric to the processing unit carrier formed of side walls 19, 20 and cross member 23. The stability of the work stations is thereby enhanced. Through the displacement of the work stations with respect to one another it is possible to accommodate the spacing of the processing unit stations at a well defined position in each case.

While there have been illustrated and described several embodiments of the present invention it will be understood that various changes and modifications may occur to those skilled in the art. It is intended to cover all modifications and equivalents within the scope of the application and the appended claims.

What is claimed is:

1. In a vacuum packing machine for producing sealed packages from a web of packing material, wherein a continuous chain drive is provided for moving the web, at least one working station is positioned adjacent the web on the chain drive for processing the web, means are provided for moving the chain drive, and means are provided for reciprocating the working station, whereby the web is processed by the working station while the web is being moved by the chain drive; the improvement wherein said means for moving said chain drive comprises rack means, said work station reciprocating means comprising a piston cylinder drive directly connected to reciprocate said rack means, a pair of gears positioned to mesh with the teeth of said rack means, a pair of sprockets connected to drive said chain drive, overrunning coupling means coupling each of said gears to a separate sprocket of said sprockets, whereby said sprockets drive said chain drive during times of opposite directions of movement of said rack means and said chain drive is substantially continuously driven in one direction, with each of said sprockets driving said chain drive only during one movement direction of said rack means, said means for reciprocating said working station comprising means directly connecting said rack to said working station for directly driving said working station to reciprocate synchronously with said rack means, whereby said working station is moved with the same speed as said chain drive by the same piston cylinder drive in response to a continuous square wave type application of the driving force by said piston cylinder drive, whereby all moving elements are driven in a locked manner and a sinus wave type application of force is avoided.

2. The vacuum packing machine of claim 1, wherein said rack means comprises a pair of racks having oppositely directed teeth each being meshed with a separate one of said gears.

3. The vacuum packing machine of claim 1, comprising a rod connected to directly drive said rack means from said piston cylinder drive.

4. The vacuum packing machine of claim 3, wherein said working station is connected to said rod.

5. The vacuum packing machine of claim 4, whrein said working station has a processing unit positioned above said chain drive, side wall means affixed to said processing unit, a second piston cylinder connected to said side wall means below said chain drive, and lifting plate means connected to said second piston cylinder for movement toward and away from said processing unit, said side wall means being directly connected to said rod.

6. The vacuum packing machine of claim 5, wherein the connection between said side wall means and said rod is adjustable lengthwise of said rod.

7. The vacuum packing machine of claim 1, wherein said chain drive comprises first and second continuous, parallel chains, said rack means comprising a first pair of racks and a second pair of racks, said first mentioned gears being positioned to mesh with the teeth of the racks of said first pair of racks, said first mentioned pair of sprockets being connected to drive said first chain, and further comprising a second pair of gears positioned to mesh with the teeth of the racks of said second pair of racks, a second pair of sprockets connected to drive said second chain, overrunning coupling means coupling each sprocket of said second pair of sprockets to a separate gear of said second pair of gears, whereby said second chain is driven by said sprockets of said second pair of sprockets in the same direction as said first chain.

8. The vacuum packing machine of claim 7, further comprising a pair of rods separately connecting said piston cylinder drive to directly reciprocate said first and second pairs of racks.

9. The vacuum packing machine of claim 8, wherein said working station comprises a processing unit adjacent one side of said chains, a pair of side walls affixed to said processing unit and extending to the other side of said chains, and a cross bar interconnecting said side walls on said other side of said chains, thereby forming a rigid frame, said side walls being fixedly connected to separate ones of said rods.

10. The vacuum packing machine of claim 9, wherein said working station further comprises a second piston cylinder affixed to said cross bar, and processing unit means connected to said second piston cylinder for reciprocation toward and away from said processing unit.

* * * * *